US009513362B2

(12) United States Patent
Chiou et al.

(10) Patent No.: US 9,513,362 B2
(45) Date of Patent: *Dec. 6, 2016

(54) METHOD FOR ENHANCING POSITIONING MEASUREMENT AND COMMUNICATIONS APPARATUS UTILIZING THE SAME

(71) Applicant: MediaTek Inc., Hsin-Chu (TW)

(72) Inventors: Tsung-Yu Chiou, Zhudong Township, Hsinchu Country (TW); Yuan-Wen Ting, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,727

(22) Filed: Aug. 6, 2015

(65) Prior Publication Data

US 2015/0346315 A1 Dec. 3, 2015

Related U.S. Application Data

(63) Continuation of application No. 14/066,963, filed on Oct. 30, 2013, now Pat. No. 9,137,775.

(51) Int. Cl.
| | |
|---|---|
| *H04W 24/00* | (2009.01) |
| *G01S 5/02* | (2010.01) |
| *H04W 64/00* | (2009.01) |
| *H04L 29/08* | (2006.01) |
| *H04W 4/02* | (2009.01) |
| *H04W 24/08* | (2009.01) |
| *G01S 5/10* | (2006.01) |

(52) U.S. Cl.
CPC ............ *G01S 5/0252* (2013.01); *G01S 5/0205* (2013.01); *G01S 5/0236* (2013.01); *G01S 5/10* (2013.01); *H04L 29/08657* (2013.01); *H04W 4/02* (2013.01); *H04W 24/08* (2013.01); *H04W 64/00* (2013.01); *Y02B 60/50* (2013.01)

(58) Field of Classification Search
CPC ........ H04W 64/00; H04W 4/02; H04W 24/08; G01S 5/0252; G01S 5/0205; G01S 5/0236; G01S 5/10; H04L 29/08657
USPC ................ 455/456.1, 434, 435.1, 435.2, 449
See application file for complete search history.

(56) References Cited

U.S. PATENT DOCUMENTS

| | | | | |
|---|---|---|---|---|
| 5,973,643 | A | * 10/1999 | Hawkes | ................. G01S 1/045 342/457 |
| 6,982,971 | B2 | 1/2006 | Tiedemann et al. | |

(Continued)

*Primary Examiner* — Khai M Nguyen
(74) *Attorney, Agent, or Firm* — McClure, Qualey & Rodack, LLP

(57) ABSTRACT

A method for enhancing positioning measurement and a communications apparatus are disclosed. The method includes receiving an observed mobility difference of arrival (OTDOA) request and a search list of cells provided by a network at a second time point, comparing the received search list to a stored search list of cells which is received from the network at a first time point and stored in a database, searching at least one of the cells from the received search list by using different search ranges adjusted according to the comparison result, and storing the at least one of the cells in the database, and performing OTDOA measurements from the at least one of the cells. The corresponding communications apparatus includes a receiving module, a comparing module, a searching module, and a measuring module, configured to carry out the above-identified operations.

24 Claims, 6 Drawing Sheets

(56) References Cited

U.S. PATENT DOCUMENTS

| | | | |
|---|---|---|---|
| 8,938,252 B2* | 1/2015 | Alles | G01S 5/021 |
| | | | 342/357.29 |
| 9,137,775 B2* | 9/2015 | Chiou | H04L 29/08657 |
| 2004/0023634 A1 | 2/2004 | Jeong et al. | |
| 2007/0197211 A1* | 8/2007 | Lee | H04W 48/16 |
| | | | 455/432.1 |
| 2011/0201332 A1* | 8/2011 | Siomina | H04W 64/00 |
| | | | 455/434 |
| 2011/0275385 A1* | 11/2011 | Escolar-Piedras | H04W 64/00 |
| | | | 455/456.1 |
| 2012/0040685 A1 | 2/2012 | Escolar-Piedras et al. | |
| 2012/0270572 A1 | 10/2012 | Siomina et al. | |
| 2013/0324163 A1 | 12/2013 | Werner et al. | |
| 2015/0172976 A1* | 6/2015 | Kazmi | H04W 64/00 |
| | | | 455/434 |

\* cited by examiner

METHOD FOR ENHANCING POSITIONING MEASUREMENT AND COMMUNICATIONS APPARATUS UTILIZING THE SAME

CROSS REFERENCE TO RELATED APPLICATIONS

This application is a Continuation of U.S. patent application Ser. No. 14/066,963, filed on Oct. 30, 2013. The entirety of which is incorporated by reference herein.

BACKGROUND OF THE INVENTION

1. Field of the Invention

Aspects of the present invention relate generally to wireless communication systems, and more particularly, to methods and communications apparatuses for enhancing positioning measurements.

2. Description of the Related Art

As wireless devices, such as a wireless user equipment (UE), become indispensable, more wireless phone providers are increasing the accuracy in locating a UE. For example, the US Federal Communication Commission (FCC) requires that a wireless phone provider be able, within a 50 meter radius, to locate 67% of wireless emergency calls from a UE, and within a 150 meter radius, locate 95% of wireless emergency calls from a UE. One approach to achieving desired positioning accuracy is to use network assisted observed time difference of arrival (OTDOA) for positioning 3rd Generation Partnership Project (3GPP) long-term evolution (LTE) compliant wireless devices. Based on this approach, the differences in the time of arrival of known signals sent from nearby cells are measured at the UE and the position of the UE is calculated based on the differences of the arrival times. The UEs are usually required to measure the arrival time differences and report them to the networks.

Because the UE is typically a mobile device, the UE is typically mobile. The networks may only know which cell the UE is "camped" on, and thus, can only assume that the UE is somewhere within the coverage of the cell area. However, the area may be quite large. To locate the UE, the networks need OTDOA from a number of cells. In current systems, the UE is provided a search list of 24 or more cells to make OTDOA observations for.

However, the OTDOA neighbor cell list size currently consists of at most 72 cells. The UE needs to blindly search the cells following the order of the search list. This wastes time and power, and significantly increases computations and process load.

Therefore, wireless communications apparatuses and methods for reducing power consumption and process load are required.

BRIEF SUMMARY OF THE INVENTION

A detailed description is given in the following embodiments with reference to the accompanying drawings.

Methods for enhancing positioning measurement and communications apparatuses are provided.

In one exemplary embodiment, the invention is directed to a method for enhancing positioning measurement. The method comprises: receiving an observed time difference of arrival (OTDOA) request and a search list of cells provided by a network at a second time point; comparing the received search list to a stored search list of cells which is received at a first time point and stored in a database; searching at least one of the cells from the received search list by using different search ranges adjusted according to the comparison result, and storing the at least one of the cells in the database; and performing OTDOA measurements by detecting positioning reference signals (PRS) from the at least one of the cells.

In one exemplary embodiment, the invention is directed to a communications apparatus. The communications apparatus comprises a receiving module, a comparing module, a searching module and a measuring module. The receiving module is configured to receive an observed time difference of arrival (OTDOA) request and a search list of cells provided by a network at a second time point. The comparing module is coupled to the receiving module and configured to compare the received search list to a stored search list of cells which is received at a first time point and stored in a database. The searching module is coupled to the comparing module and configured to search at least one of the cells from the received search list by using different search ranges adjusted according to the comparison result, and store the at least one of the cells in the database. The measuring module is coupled to the searching module and configured to perform OTDOA measurements by detecting positioning reference signals (PRS) from the at least one of the cells.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
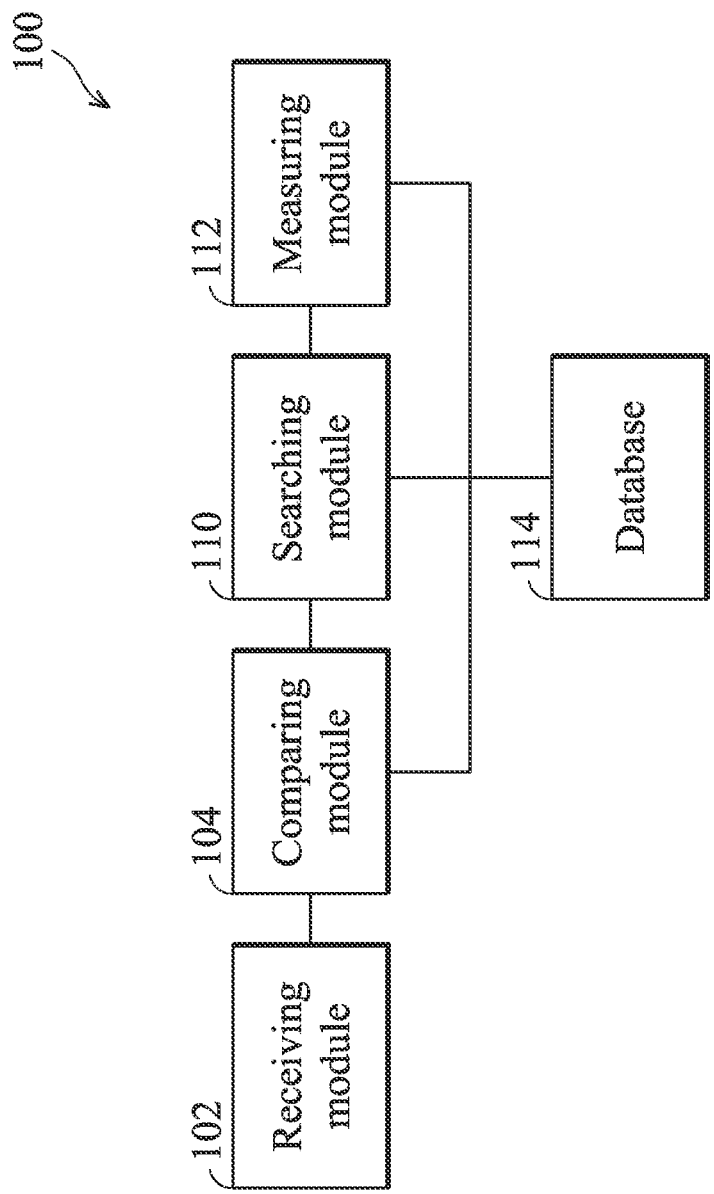
FIG. 1 is a block diagram of a communications apparatus according to a first embodiment of the present invention.

Several exemplary embodiments of present disclosure are described with reference to FIGS. 1 through 5B, which generally relate to a method and communications apparatus for enhancing positioning measurements. It is to be understood that the following disclosure provides various different embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and did not in itself dictate a relationship between the various described embodiments and/or configurations.

The embodiments described below are exemplary and made for increased understanding. The embodiments are not limited to any particular radio access technology (RAT), terminology, or wireless standard, for example LTE, E-UTRAN, LTE-A, 3G, 4G, etc.

FIG. 1 is a block diagram of a communications apparatus 100 according to a first embodiment of the present invention. The communications apparatus 100 may represent, without limitation, an apparatus including a UE such as a terminal or mobile station. The communications apparatus 100 includes, at least, a receiving module 102, a comparing module 104, a searching module 110, a measuring module 112 and a database 114. Other functions may also be provided. The communications apparatus 100 may provide point-to-point and/or point-to-multipoint communication services.

The receiving module 102 receives an observed time difference of arrival (OTDOA) request from a network and a search list of cells provided by the network at a second time point. The comparing module 104 is coupled to the receiving module 102, and compares the search list provided by the network to a search list stored in the database 114, wherein the search list stored in the database 114 is received from the network at a first time point. The searching module 110 is coupled to the comparing module 104, searches at least one of the cells from the received search list by using different search ranges adjusted according to the comparison result, and stores the at least one of the cells in the database 114. The measuring module 112 is coupled to the searching module 110 and performs the OTDOA measurements by detecting positioning reference signals (PRS) from the at least one of the cells.

The database 114 is coupled to the comparing module 104, the searching module 110 and the measuring module 112, and is configured to store at least a search list. Note that in some embodiments of the invention, the database 114 can be implemented in the communications apparatus 100 (for example, a computer, a notebook, a tablet, a mobile phone, etc.), and can also be implemented in other electronic devices (for example, computers, servers, storage devices, etc.) coupled with each other via a communication network, a serial communication (such as RS232) or a bus. The database 114 may be a device or an apparatus which can store information, such as, but not limited to, a hard disk drive, a memory, a computer or a server and so on. In the embodiments of the invention, the communications apparatus 100 may be a notebook computer, a cellular phone, a portable gaming device, a portable multimedia player, a tablet computer, a Global Positioning System (GPS) receiver, a Personal Digital Assistant (PDA), or others.

Figure 2:
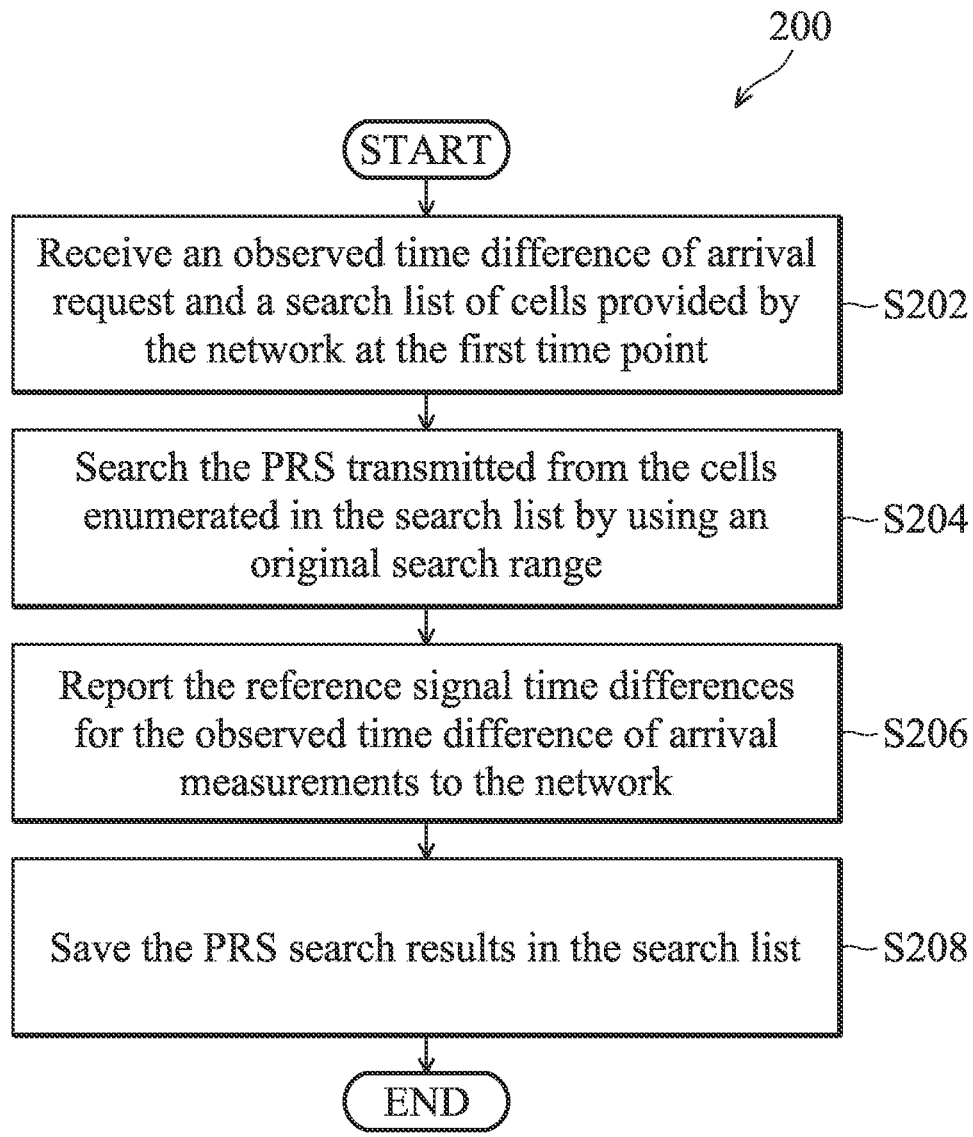
FIG. 2 depicts a flow chart illustrating the communications apparatus searching for positioning reference signals according to a search list received from a network at the first time point in accordance with one embodiment of the present invention.

FIG. 2 depicts a flow chart 200 illustrating the communications apparatus 100 searching for positioning reference signals according to a search list received from the network at the first time point in accordance with one embodiment of the present invention.

First, in step S202, the communications apparatus 100 receives an observed time difference of arrival (OTDOA) request and a search list of cells provided by the network at the first time point. In step S204, the communications apparatus 100 searches or detects the PRS transmitted from the cells enumerated in the search list by using an original search range. In step S206, the communications apparatus 100 reports the reference signal time differences (RSTD) for the observed time difference of arrival measurements to the network. Finally, in step S208, the communications apparatus 100 saves the PRS search results in the search list. It should be noted that the PRS search results in the search list may include, for example a cell ID field, a measurement quality such as SNR, CINR, SINR, RSRP, RSRQ, and time-of-arrival (TOA).

Figure 3:
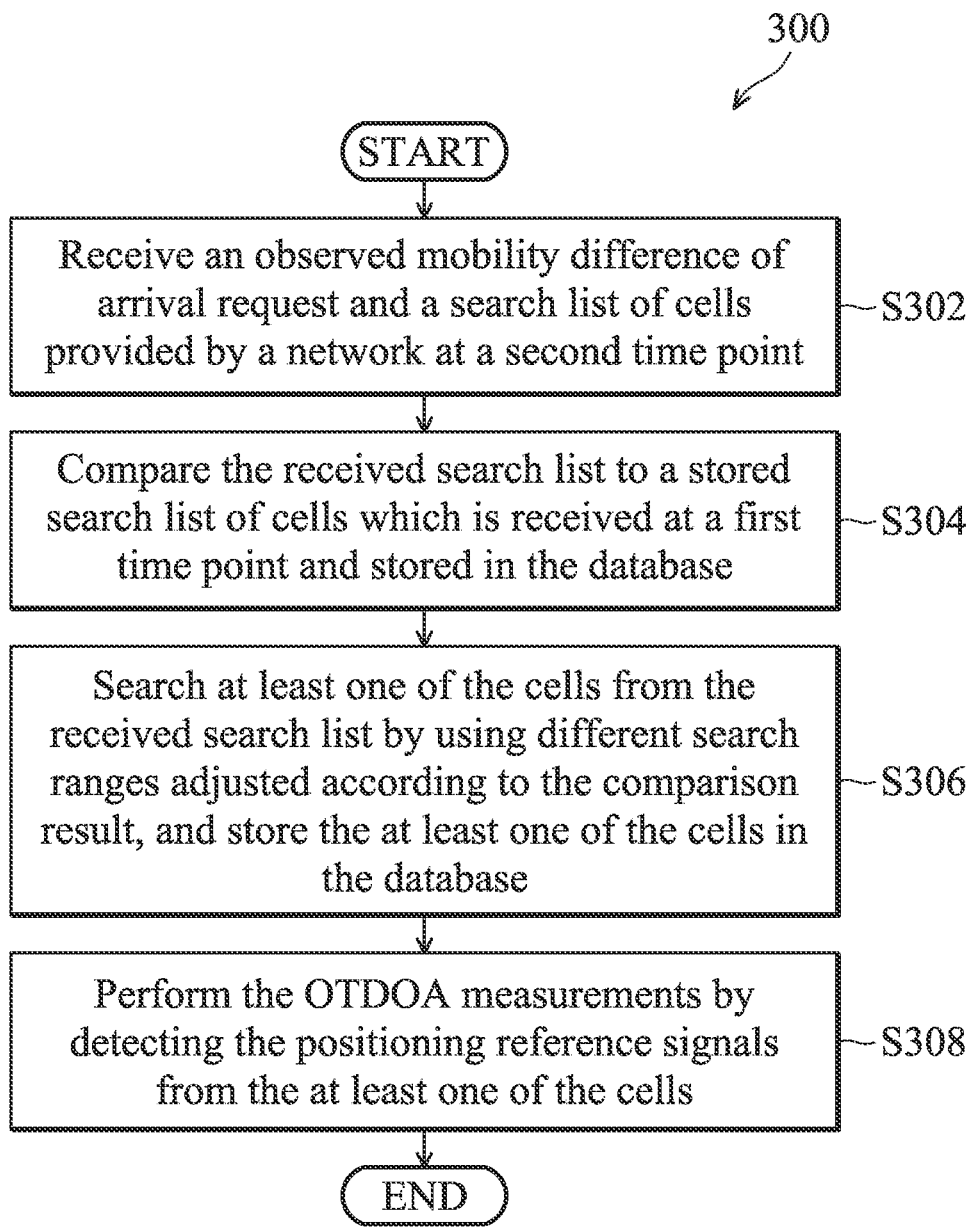
FIG. 3 is a flow diagram illustrating the method for enhancing positioning measurement according to the first embodiment of the present invention with reference to FIG. 1.

FIG. 3 is a flow diagram 300 illustrating the method for enhancing positioning measurement according to the first embodiment of the present invention with reference to FIG. 1. First, as discussed above, in step S302, the receiving module receives an observed mobility difference of arrival (OTDOA) request and a search list of cells provided by a network at a second time point. Then, in step S304, the comparing module compares the received search list to a stored search list of cells which is received at a first time point and stored in the database. Next, in step S306, the searching module searches at least one of the cells from the received search list by using different search ranges adjusted according to the comparison result, and stores the at least one of the cells in the database. Finally, in step S308, the measuring module performs the OTDOA measurements by detecting the positioning reference signals (PRS) from the at least one of the cells.

Figure 4:
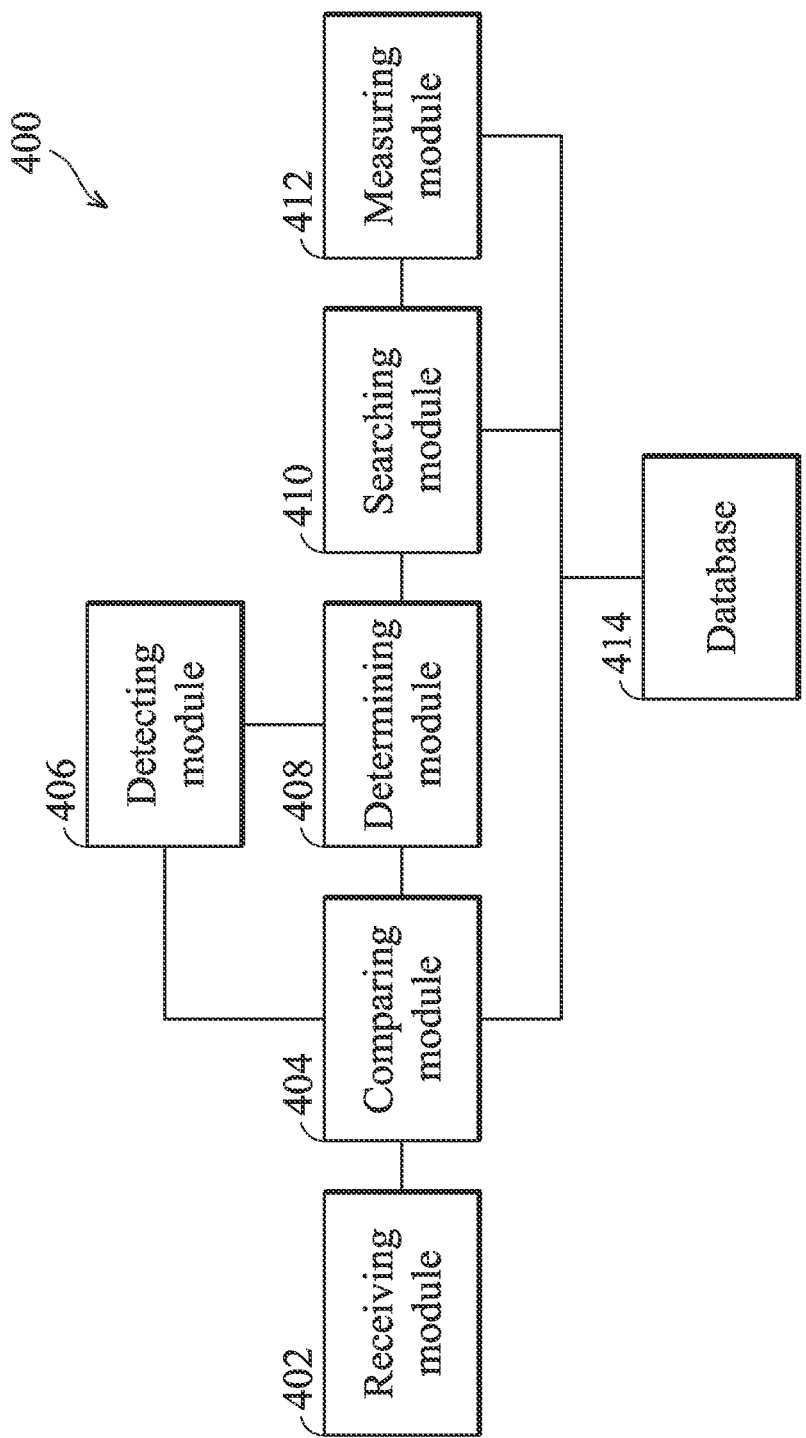
FIG. 4 is a block diagram of a communications apparatus according to a second embodiment of the present invention.

FIG. 4 is a block diagram of a communications apparatus 400 according to a second embodiment of the present invention. The communications apparatus 400 comprises at least a receiving module 402, a comparing module 404, a detecting module 406, a determining module 408, a searching module 410, a measuring module 412 and a database 414.

The components having the same name as described in the first embodiment have the same function, so the details related to the functions of the components will be omitted. The main difference between FIG. 1 and FIG. 4 is that the communications apparatus 400 further comprises the detecting module 406 and the determining module 408. The detecting module 406 is coupled to the comparing module 404, and the determining module 408 is coupled to the detecting module 406 and the searching module 410.

In the second embodiment, the detecting module 406 is configured to detect mobility information of the communications apparatus 400. The detecting module 406 may be a sensor which can detect mobility parameters which include, but are not limited to, acceleration, distance, etc. The determining module 408 is configured to receive the mobility information detected by the detecting module 406, and determine whether the mobility information has met a condition. After the comparing module 404 compares the received search list to the stored search list, if the comparing module 404 determines that the received search list is the same as the stored search list and the determining module 408 determines that the mobility information has met the condition, the searching module 410 searches at least one of the cells from the received search list by using an original search range.

In another embodiment, after the searching module 410 searches the at least one of the cells from the received search list by using the original search range, if the measuring module 412 did not detect any positioning reference signal, the searching module 410 may search the cells from the received search list by using a second search range adjusted according to the mobility information, wherein the second search range is larger than the original search range.

However, if the comparing module 404 determines that the received search list is the same as the stored search list and the determining module 408 determines that the mobility information did not meet the condition, the searching module 410 searches the cells from the stored search list by using a full search range. In another condition, if the comparing module 404 determines that the received search list is not the same as the stored search list and the determining module 408 determines that the mobility information has met the condition, the searching module 410 searches the cells enumerated in both search lists by using a second search range adjusted according to the mobility information, wherein the second search range is larger than the original search range (the searching module searches the cells having positioning reference signals that are overlapping with the positioning reference signals transmitted from the cells enumerated in the stored search list). On the other hand, if the comparing module 404 determines that the received search list is not the same as the stored search list and the determining module 408 determines that the mobility information did not meet the condition, the searching module 410 searches all of the cells from the received search list by using the full search range (so-called "Blind Search").

In addition, the determining module can determine whether the mobility information has met the condition according to, for example, but not be limited to, the following three manners.

(1) The mobility information can be correlated with a time difference between the first time and the second time. When the mobility information represents the time difference, the determining module determines whether the time difference has met the condition, wherein the condition is that the time difference is less than a predetermined value.

(2) The mobility information can be correlated with handover-related information between the first time point and the second time point. When the mobility information represents the handover-related information, the determining module determines whether the handover-related information has met the condition, wherein the condition is that the communications apparatus did not perform a handover between different cells.

(3) The mobility information can be correlated with a distance during a period between the first time point and the second time point, for example, Global Positioning System (GPS) information from GPS satellites. When the mobility information represents the distance, the determining module determines whether the distance has met the condition, wherein the condition is that the distance during the period between the first time point and the second time point is less than a predetermined range.

Figure 5A:
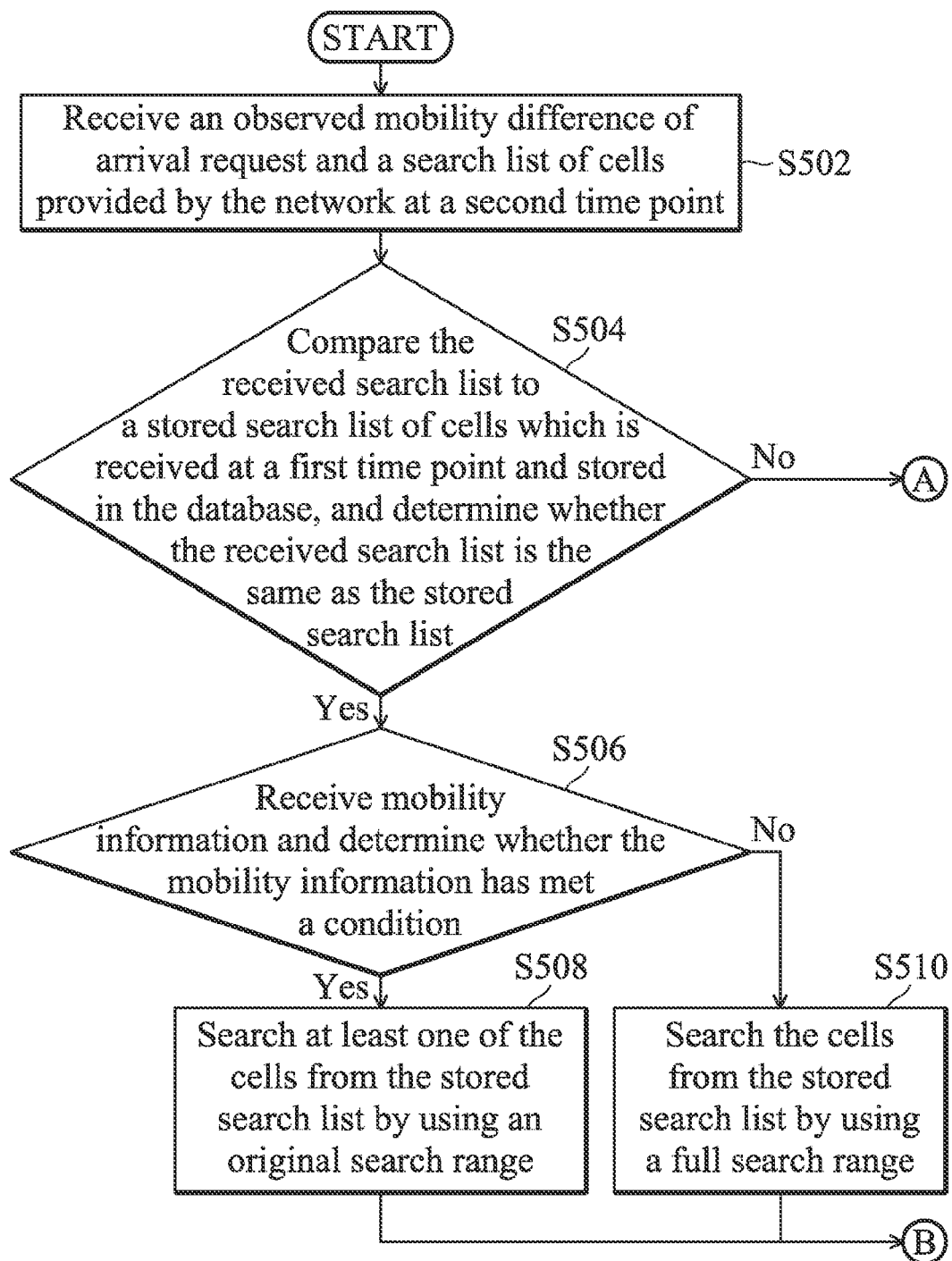
FIGS. 5A-5B are flow diagrams illustrating the method for enhancing positioning measurement according to the second embodiment of the present invention.
Figure 5B:
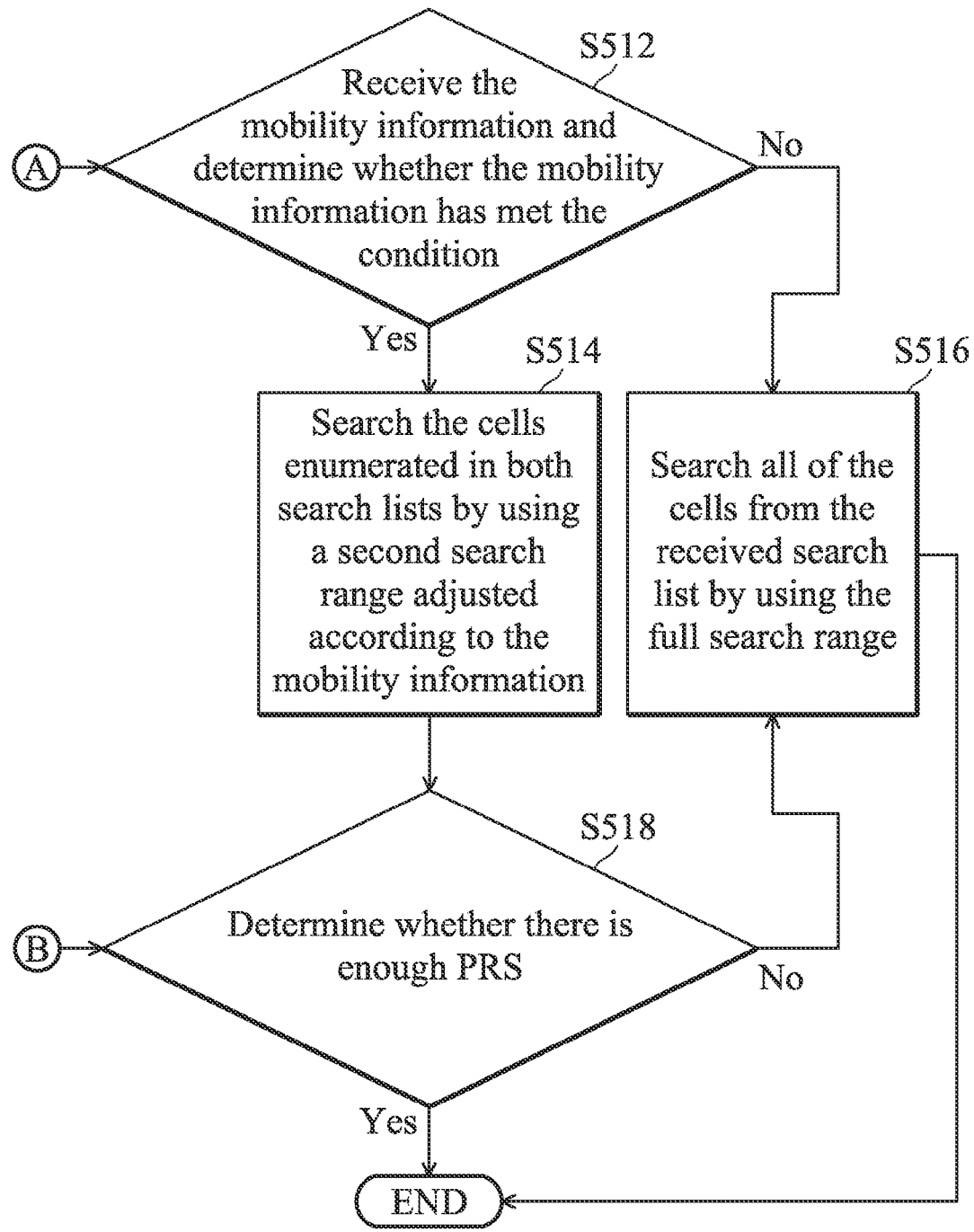

FIGS. 5A-5B are flow diagrams 500 illustrating the method for enhancing positioning measurement according to the second embodiment of the present invention. First, in step S502, the receiving module receives an observed mobility difference of arrival (OTDOA) request and a search list of cells provided by a network at a second time point. Then, in step S504, the comparing module compares the received search list to a stored search list of cells which is received at a first time point and stored in the database, and determines whether the received search list is the same as the stored search list. When the comparing module determines that the received search list is the same as the stored search list, in step S506, the determining module receives mobility information and determines whether the mobility information has met a condition. If so, in step S508, the searching module searches at least one of the cells from the stored search list by using an original search range. If not, in step S510, the searching module searches the cells from the stored search list by using a full search range. On the other hand, when the comparing module determines that the received search list is not the same as the stored search list, in step S512, the determining module also receives mobility information and determines whether the mobility information has met the condition. If so, in step S514, the searching module searches the cells enumerated in both search lists by using a second search range adjusted according to the mobility information, wherein the second search range is larger than the original search range. If not, in step S516, the searching module searches all of the cells from the received search list by using the full search range. After step S508, S510 and S514 are finished, in step S518, the searching module determines whether there is enough PRS. If so, the process comes to an end or otherwise returns to step S516.

Therefore, there is no need for the UE to search all of the cells enumerated in a search list provided by the network. The UE merely searches part of the cells enumerated in the search list already stored in the database, such that the power consumption of the UE, and computations performed and time used by the UE are reduced when the UE performs the OTDOA measurements.

It is understood that although each of the aforementioned modules or units of the invention has been illustrated as a single component of the communications apparatus, two or more such components can be integrated together, thereby decreasing the number of the components within the communications apparatus. Similarly, one or a multiple of the above components can be separately used, thereby increasing the number of the components within the communications apparatus.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for enhancing positioning measurement, comprising:
   receiving an observed mobility difference of arrival (OTDOA) request and a search list of cells provided by a network at a second time point;
   comparing the received search list to a stored search list of cells which is received from the network at a first time point and stored in a database;
   searching at least one of the cells from the received search list by using different search ranges adjusted according to the comparison result, and storing the at least one of the cells in the database; and performing OTDOA measurements from the at least one of the cells.

2. The method for enhancing positioning measurement as claimed in claim 1, further comprising:
detecting mobility information; and
determining whether the mobility information has met a condition.

3. The method for enhancing positioning measurement as claimed in claim 2, wherein after comparing the received search list to the stored search list, when it is determined that the received search list is the same as the stored search list and the mobility information has met the condition, the at least one of the cells is searched from the stored search list by using an original search range.

4. The method for enhancing positioning measurement as claimed in claim 3, wherein after searching the at least one of the cells from the stored search list by using the original search range, when no positioning reference signal has been detected, the cells from the stored search list are searched by using a second search range adjusted according to the mobility information, wherein the second search range is larger than the original search range.

5. The method for enhancing positioning measurement as claimed in claim 2, wherein when it is determined that the received search list is the same as the stored search list and the mobility information did not meet the condition, the cells from the stored search list are searched by using a full search range.

6. The method for enhancing positioning measurement as claimed in claim 2, wherein when it is determined that the received search list is not the same as the stored search list and the mobility information has met the condition, the cells enumerated in both search lists are searched by using a second search range adjusted according to the mobility information, wherein the second search range is larger than an original search range.

7. The method for enhancing positioning measurement as claimed in claim 2, wherein when it is determined that the received search list is not the same as the stored search list and the mobility information did not meet the condition, all of the cells from the received search list are searched by using a full search range.

8. The method for enhancing positioning measurement as claimed in claim 3, wherein the mobility information at least includes a time difference between the first time and the second time, and the condition is that the time difference is less than a predetermined value.

9. The method for enhancing positioning measurement as claimed in claim 8, further comprising:
indicating that the time difference has expired,
wherein after searching the at least one of the cells from the received search list by using the original search range, when the time difference has expired and no positioning reference signal has been detected, the cells from the received search list are searched by using a second search range adjusted according to the mobility difference, wherein the second search range is larger than the original search range.

10. The method for enhancing positioning measurement as claimed in claim 2, wherein the mobility information is handover-related information between the first time and the second time, and the condition is that the communications apparatus did not perform a handover operation.

11. The method for enhancing positioning measurement as claimed in claim 2, wherein the mobility information is a distance during a period between the first time and the second time, and the condition is that the distance is less than a predetermined range.

12. The method for enhancing positioning measurement as claimed in claim 1, wherein the search list includes a cell ID field, a measurement quality and time-of-arrival (TOA).

13. A communications apparatus, comprising:
a receiving circuit, configured to receive an observed time difference of arrival (OTDOA) request and a search list of cells provided by a network at a second time point;
a comparing circuit, coupled to the receiving module and configured to compare the received search list to a stored search list of cells which is received from the network at a first time point and stored in a database;
a searching circuit, coupled to the comparing module and configured to search at least one of the cells from the received search list by using different search ranges adjusted according to the comparison result, and store the at least one of the cells in the database; and
a measuring circuit, coupled to the searching module and configured to perform OTDOA measurements from the at least one of the cells.

14. The communications apparatus as claimed in claim 13, further comprising:
a detecting circuit, configured to detect mobility information; and
a determining circuit, configured to receive the mobility information and determine whether the mobility information has met a condition.

15. The communications apparatus as claimed in claim 14, wherein after the comparing circuit compares the received search list to the stored search list, when the comparing module determines that the received search list is the same as the stored search list and the determining circuit determines that the mobility information has met the condition, the searching circuit searches the at least one of the cells from the stored search list by using an original search range.

16. The communications apparatus as claimed in claim 15, wherein after the searching circuit searches the at least one of the cells from the stored search list by using the original search range, when the measuring circuit did not detect any positioning reference signal, the searching circuit searches the cells from the stored search list by using a second search range adjusted according to the mobility information, wherein the second search range is larger than the original search range.

17. The communications apparatus as claimed in claim 14, wherein when the comparing circuit determines that the received search list is the same as the stored search list and the determining circuit determines that the mobility information did not meet the condition, the searching circuit searches the cells from the stored search list by using a full search range.

18. The communications apparatus as claimed in claim 14, wherein when the comparing module determines that the received search list is not the same as the stored search list and the determining circuit determines that the mobility information has met the condition, the searching circuit searches the cells enumerated in both search lists by using a second search range adjusted according to the mobility information, wherein the second search range is larger than an original search range.

19. The communications apparatus as claimed in claim 14, wherein when the comparing circuit determines that the received search list is not the same as the stored search list and the determining circuit determines that the mobility information did not meet the condition, the searching circuit searches all of the cells from the received search list by using a full search range.

20. The communications apparatus as claimed in claim 15, wherein the mobility information at least includes a time difference between the first time and the second time, and the determining circuit determines whether the time difference is less than a predetermined value.

21. The communications apparatus as claimed in claim 20, further comprising:
a time out counter, configured to indicate that the time difference has expired,
wherein after the searching circuit searches the at least one of the cells from the received search list by using the original search range, when the time out counter indicates that the time difference has expired and the measuring circuit did not detect any positioning reference signal, the searching circuit searches the cells from the stored search list by using a second search range adjusted according to the mobility difference, wherein the second search range is larger than the original search range.

22. The communications apparatus as claimed in claim 14, wherein the mobility information is handover-related information between the first time and the second time, and the determining circuit determines whether the communications apparatus performed a handover operation.

23. The communications apparatus as claimed in claim 14, wherein the mobility information is a distance during a period between the first time and the second time, and the determining circuit determines whether the distance is less than a predetermined range.

24. The communications apparatus as claimed in claim 13, wherein the search list includes a cell ID field, a measurement quality and time-of-arrival (TOA).

* * * * *